(12) United States Patent
Slavicek

(10) Patent No.: US 11,337,784 B2
(45) Date of Patent: May 24, 2022

(54) ARTIFICIAL TEETH

(71) Applicant: DAVIS, SCHOTTLANDER & DAVIS LTD, Letchworth Garden City (GB)

(72) Inventor: Rudolf Slavicek, Vienna (AT)

(73) Assignee: DAVIS, SCHOTTLANDER & DAVIS LTD, Letchworth Garden City (GB)

( * ) Notice: Subject to any disclaimer, the term of this patent is extended or adjusted under 35 U.S.C. 154(b) by 0 days.

(21) Appl. No.: 15/522,141

(22) PCT Filed: Nov. 9, 2015

(86) PCT No.: PCT/EP2015/076047
§ 371 (c)(1),
(2) Date: Apr. 26, 2017

(87) PCT Pub. No.: WO2016/071529
PCT Pub. Date: May 12, 2016

(65) Prior Publication Data
US 2017/0312061 A1    Nov. 2, 2017

(30) Foreign Application Priority Data
Nov. 7, 2014   (GB) ...................................... 1419860

(51) Int. Cl.
*A61C 13/097*  (2006.01)
*A61C 13/00*   (2006.01)
*A61C 13/087*  (2006.01)

(52) U.S. Cl.
CPC ............ *A61C 13/097* (2013.01); *A61C 13/00* (2013.01); *A61C 13/0003* (2013.01);
(Continued)

(58) Field of Classification Search
CPC ..... A61C 13/00; A61C 13/08; A61C 13/0004; A61C 13/0006; A61C 13/0028;
(Continued)

(56) References Cited

U.S. PATENT DOCUMENTS 4,208,794 A * 6/1980 Gerber ................. A61C 13/097
                                                433/197
4,642,052 A * 2/1987 Carlson ................ A61C 13/097
                                                433/189
(Continued)

FOREIGN PATENT DOCUMENTS

EP         1621157 A1    2/2006
JP      2002-177301 A    6/2002
(Continued)

OTHER PUBLICATIONS

International Search Report and Written Opinion for International Application No. PCT/EP2015/076047 dated Mar. 7, 2016.

*Primary Examiner* — Yogesh P Patel
(74) *Attorney, Agent, or Firm* — McCarter & English, LLP; Maria Laccotripe Zacharakis; Mei Bai

(57) ABSTRACT

A set of artificial teeth for a denture comprises a maxillary unit and a mandibular unit. When set up in lingualised occlusion or balanced occlusion, at least one of following occurs: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

16 Claims, 5 Drawing Sheets

(52) U.S. Cl.
CPC ...... *A61C 13/0004* (2013.01); *A61C 13/0006* (2013.01); *A61C 13/0028* (2013.01); *A61C 13/087* (2013.01)

(58) Field of Classification Search
CPC ... A61C 13/087; A61C 13/097; A61C 13/007; A61C 13/09; A61C 13/0003
USPC .............. 433/167–172, 190–196, 202.1, 213
See application file for complete search history.

(56) References Cited

U.S. PATENT DOCUMENTS

| | | | | |
|---|---|---|---|---|
| 5,501,598 | A | * | 3/1996 | Misch .................... A61C 13/08 433/192 |
| 5,951,289 | A | * | 9/1999 | Kura .................... A61C 13/097 433/197 |
| 2005/0095559 | A1 | * | 5/2005 | Monkmeyer ........ A61C 13/097 433/171 |
| 2006/0263749 | A1 | * | 11/2006 | Koide ................ A61C 13/0024 433/197 |
| 2010/0035208 | A1 | * | 2/2010 | Kadobayashi ....... A61C 13/097 433/191 |
| 2010/0040997 | A1 | * | 2/2010 | Kadobayashi ......... A61C 13/10 433/191 |
| 2010/0151419 | A1 | * | 6/2010 | Kadobayashi ..... A61C 13/0003 433/171 |
| 2010/0151424 | A1 | * | 6/2010 | Kadobayashi ......... A61C 13/10 433/196 |
| 2011/0039231 | A1 | * | 2/2011 | Kadobayashi ....... A61C 13/097 433/171 |
| 2015/0132718 | A1 | * | 5/2015 | Kerschensteiner .......................... A61C 13/0004 433/196 |

FOREIGN PATENT DOCUMENTS

| JP | 2002177301 | A | * | 6/2002 | ......................... 13/8 |
|---|---|---|---|---|---|
| JP | 2002177301 | A | * | 6/2002 | |

* cited by examiner

ARTIFICIAL TEETH

FIELD OF THE INVENTION

The present invention relates to a set of artificial teeth, a method for the production of a denture utilising the set of artificial teeth.

BACKGROUND OF THE INVENTION

Dentures are prosthetic devices constructed to replace missing teeth. They are supported by the surrounding soft and hard tissues of the oral cavity. Complete dentures replace all of the teeth in the upper and/or the lower jaw, whereas partial dentures only replace some of the teeth in the jaw concerned. For example, partial dentures may replace one or more front teeth and/or one or more of the posterior teeth.

In natural human dentition, the tooth distribution in each quadrant of the mouth consists of three front teeth, and four or five posterior teeth including two pre-molars and two or three molars. When constructing a complete denture either three or more typically four posterior teeth are used. When constructing a partial denture, the number of teeth used depends on factors such as the number of remaining natural teeth and the space available. The third molar tooth is not always present in the natural human dentition, and is not usually included in dentures.

The teeth of the natural human dentition are frequently referred to by dentists, clinicians, and dental technicians using the Palmer notation. The Palmer notation is a system used to associate information with a specific tooth, and is a simple system in that it does not necessitate differentiating between left and right of the mouth. Although supposedly superseded by the FDI World Dental Federation notation, it continues to be the preferred method used by many practitioners in the United Kingdom and in other countries.

In the Palmer system, the permanent adult teeth are numbered from 1 to 8, the numbering indicating the position from the midline. The Palmer notation additionally uses a symbol (⌋ ⌊ ⌉ ⌈) designating in which quadrant the tooth is found. Hence the left and right maxillary central incisors have the same number, "1", but the right one has the symbol, "⌋", underneath it, while the left one has the symbol, "⌊".

The Palmer notation consists of a symbol (⌋ ⌊ ⌉ ⌈) designating in which quadrant the tooth is found and a number indicating the position from the midline. Adult teeth are numbered 1 to 8. Hence the left and right maxillary central incisor would have the same number, "1", but the right one would have the symbol, "⌋", underneath it, while the left one would have, "⌊". It is also commonplace to refer to the maxillary teeth as the upper teeth, and the mandibular teeth as the lower teeth, in combination with the number given under the Palmer system.

Accordingly, the maxillary teeth of the adult human dentition may be referred to as follows: first and second incisors=upper 1 and upper 2; canine=upper 3; first and second premolars=upper 4 and upper 5 (hereinafter maxillary posterior teeth (7a) and (7b) respectively in the specification and also in the figures); first, second, and third molars=upper 6 (hereinafter maxillary posterior tooth (7c) in the specification and also in the figures), upper 7 (hereinafter maxillary posterior tooth (7d) in the specification and also in the figures), and upper 8. Similarly, the mandibular teeth of the adult human dentition may be referred to as follows: first and second incisors=lower 1 and lower 2; canine=lower 3; first and second premolars=lower 4 and lower 5 (hereinafter mandibular posterior teeth (8a) and (8b) respectively in the specification and also in the figures); first, second, and third molars=lower 6 (hereinafter mandibular posterior tooth (8c) in the specification and also in the figures), lower 7 (hereinafter mandibular posterior tooth (8d) in the specification and also in the figures), and lower 8.

Dentures should be retentive, comfortable and provide support for the cheeks and lips. They should allow effective mastication, acceptable aesthetics, clear phonetics, and contribute to the wearer's confidence and self-esteem.

The construction of complete dentures involves a number of clinical and laboratory stages that may include some or all of the following:

Primary impressions—these are the initial impressions of the patient's edentulous arches recorded in the surgery. The dental technician would then cast stone or plaster models from these impressions and construct special trays that are specifically adapted to the individual patient's mouth.

Secondary impressions—the special trays are then used to record accurate and more detailed impressions.

Jaw registration—the dental technician will construct wax rims on models produced from these initial impressions, which are representative of the position of the patient's original teeth. The rims are modified in the surgery to reflect the current situation or desired clinical outcome and will provide guidance to the technician for the set-up on wax of both anterior and posterior teeth on a trial denture. The anterior teeth are set up using anatomical markers, in order to achieve the desired aesthetic result. The posterior teeth are then set up in occlusion on the wax, in order to provide the patient with an acceptable bite and adequate function.

Denture try-in—the artificial teeth having been set up on wax by the technician, the clinician will try the dentures in the patient's mouth to check the appearance, phonetics, and function.

Denture fit—once the try-in has proved acceptable, the trial dentures are processed and finished and the clinician finally fits the dentures.

Modern technology has allowed many of these stages to become digitised and a modified workflow has evolved and will continue to be developed:

Impressions—primary impressions and secondary impressions may still be recorded and the laboratory will digitally scan the model and the adjusted wax rims. This will record the anatomical detail of the jaws and the desired occlusal plane. In some cases, this detail may be scanned directly at the chairside and transmitted to the dental laboratory.

Reference Points—within the denture design software Reference Points can be set to reflect the anatomical landmarks, in order to guide the set-up of the denture teeth.

Denture Design—the software allows the design of the denture base to ensure optimal coverage of the soft tissues.

Selection of Teeth—this is done virtually and the teeth are set up in the desired occlusal scheme within the denture design software. Where this takes place, the teeth are not set-up on wax and the change from balanced to lingualised occlusion or vice versa may therefore be performed digitally. In this case the rotation of the upper buccal cusps as described and claimed below may take place digitally, rather than by softening the wax.

Digital Manufacture of Dentures—after the denture design has been fine-tuned and confirmed, the dentures are constructed. This may be done by a milling machine, 3D printing or some other means of production.

The challenge faced by the dental technician is to establish a functional occlusion for the patient using artificial posterior teeth, as he may have little or no information about the patient's natural teeth and their occlusal scheme. Occlusion is defined as the relationship of the maxillary and mandibular teeth when they are in functional contact during mandibular activity.

Traditionally the two most common types of posterior tooth set up are lingualised occlusion and balanced occlusion.

In lingualised occlusion, the palatal cusps of the upper (maxillary) teeth engage in the central fossae of the lower (mandibular) teeth, with the buccal cusps of the upper teeth tilted at such an angle so that in normal function they never come into contact with the lower teeth. In lingualised occlusion, the palatal cusps of the upper posteriors make contact in centric relation in the central fossae of the lower posteriors. The buccal cusps are out of contact; however the lingual cusps remain in contact in centric, working (mandible moving to the cheek) and balancing (opposite side of mandible moving to the tongue) movements.

In previous examples of teeth designed for lingualised occlusion, the lower teeth frequently have cusps with a very low incisal angle, or have fewer or smaller cusps, or the occluding surfaces may have a saucer shape in which the upper palatal cusps move.

The advantages of lingualised occlusion in comparison with other occlusion schemes are:
  Reduced lateral stresses and dislodging forces
  Stability
  Ease of set-up as centric limited to the centric stop in the fossa
  Excellent aesthetics with buccal cusp form retained
  Enhanced functionality with good penetration of the food bolus
  Vertical forces in the centric position are more in line with the alveolar ridge In the scheme of balanced occlusion when in full contact, the palatal cusps of the upper (maxillary) teeth are in contact with the fossae of the lower (mandibular) teeth, and the buccal cusps of the lower teeth are in contact with the fossae of the upper teeth in centric occlusion. At rest, the buccal cusps of the upper teeth and the lingual cusps of the lower teeth are not normally in contact with the opposing teeth, but do come into contact during excursive movements.

On the working side, the buccal cusps of the upper posterior teeth smoothly glide into contact with the buccal cusps of the lower denture. On the balancing side, the buccal cusps of the lower posterior teeth maintain contact with the palatal cusps of the respective upper denture teeth. This bilateral balanced occlusion maintains contact between the upper and lower dentures and prevents tipping of the denture, thereby enhancing stability.

The advantages of balanced occlusion in comparison with other occlusion schemes are:
  Distribution of load
  Stability
  Reduced trauma
  Functional movement
  Masticatory efficiency
  Comfort There are different theories as to why one scheme is better or worse than the other, and many previous designs of teeth can be set up by a skilled technician to be used in either format. However, in such teeth, the set-up has to be made differently for each format and, in order to change from a balanced occlusal concept to a lingualised occlusal concept, or vice versa, some or all of the teeth have to be newly set up on the wax base or the occlusion/cusps reshaped by grinding to conform to the new scheme.

For example, WO 2004/096077 describes a set of teeth designed exclusively for lingualised occlusion. Similarly, WO 2007/071980 describes a set of artificial teeth that can be set up in balanced occlusion, bucco-lingually and/or antero-posteriorly, in which the working cusp spacings of the maxillary posterior teeth are substantially the same as those of the mandibular posterior teeth. In order to set the teeth up in lingualised occlusion, an additional spacer is required. Furthermore, US 2005/0095559 (Monkmeyer) describes a set of artificial teeth in which the stamp cusps of each tooth rest on three points of its antagonist fossa in centric relationship. However, there is no provision in any of the documents for a single set of artificial teeth that can be simply changed between occlusal schemes, particularly between a balanced and lingualised occlusion.

Similarly, US 2004/0137407 (Ivoclar Vivadent) describes a kit comprising two separate sets of posterior artificial teeth used for the production of dentures—one for lingualized occlusion and one with zero degree monoplane occlusion surfaces (i.e. for balanced occlusion). This is in keeping with the widely held view of dental technicians that separate sets of artificial teeth are required for different occlusal schemes, the possibility of artificial teeth being adjustable between two types of occlusion not being envisaged.

Therefore, there is a demand for a set of artificial teeth that is set up in either balanced or lingualised occlusion, and can be simply and readily changed to the alternate occlusal scheme, while maintaining the relative positions of the teeth concerned.

The present invention seeks to design an improved set of artificial teeth which overcomes the problems associated with existing artificial denture teeth as described above by providing a design of artificial denture teeth which are set up in either balanced or lingualised occlusal schemes and can be readily changed to the alternate occlusal scheme.

SUMMARY OF THE INVENTION

In one aspect, the present invention provides a set of artificial teeth comprising a maxillary unit (7) and a mandibular unit (8) in which, when set up in lingualised occlusion, at least one of following occurs: the palatal cusp (1a) of the maxillary posterior tooth (7a) fits into the distal fossa (1b) of the mandibular posterior tooth (8a), the palatal cusp (2a) of the maxillary posterior tooth (7b) fits into the distal fossa (2b) of the mandibular posterior tooth (8b), the mesial palatal cusp (3a) of the maxillary posterior tooth (7c) fits into the central fossa (3b) of the mandibular posterior tooth (8c), the distal palatal cusp (4a) of the maxillary posterior tooth (7c) fits onto the marginal ridge (4b) of the mandibular posterior tooth (8c) and the mesial palatal cusp (5a) of the maxillary posterior tooth (7d) fits into the central fossa (5b) of the mandibular posterior tooth (8d), and wherein the buccal cusps of the mandibular posterior teeth selected from buccal cusps ((8a'), (8b'), (8c'), and (8d')) are out of contact with the maxillary posterior teeth selected from the maxillary posterior teeth ((7a), (7b), (7c), and (7d)), such that the cusp/fossa dimensions and relationships of the teeth concerned enable the occlusal scheme for the teeth to be changed from lingualised to balanced occlusion simply by softening the wax or resin under the maxillary posterior teeth and rotating the upper buccal cusps selected from buccal cusps ((7a'), (7b'), (7c'), and (7d') downwards around the palatal cusps ((1a), (2a), (3a), (4a), and (5a)) on the maxillary posterior teeth such that the palatal cusps still remain within the centric stops of the mandibular posterior teeth selected from centric stops ((8a*), (8b*), (8c*), and (8d*)).

In another aspect, the present invention provides a set of artificial teeth comprising a maxillary unit (7) and a mandibular unit (8) in which, when set up in balanced occlusion, at least one of following occurs: the palatal cusp (1a) of the maxillary posterior tooth (7a) fits into the distal fossa (1b) of the mandibular posterior tooth (8a), the palatal cusp (2a) of the maxillary posterior tooth (7b) fits into the distal fossa (2b) of the mandibular posterior tooth (8b), the mesial palatal cusp (3a) of the maxillary posterior tooth (7c) fits into the central fossa (3b) of the mandibular posterior tooth (8c), the distal palatal cusp (4a) of the maxillary posterior tooth (7c) fits onto the marginal ridge (4b) of the mandibular posterior tooth (8c) and the mesial palatal cusp (5a) of the maxillary posterior tooth (7d) fits into the central fossa (5b) of the mandibular posterior tooth (8d), and wherein at least one of the buccal cusps of the mandibular posterior teeth selected from buccal cusps ((8a'), (8b'), (8c'), and (8d')) are in contact with the maxillary posterior teeth selected from maxillary posterior teeth ((7a), (7b), (7c), and (7d)), such that the cusp/fossa dimensions and relationships of the teeth concerned enable the occlusal scheme for the teeth to be changed from balanced to lingualised occlusion simply by softening the wax or resin under the maxillary posterior teeth and rotating the upper buccal cusps selected from buccal cusps ((7a'), (7b'), (7c'), and (7d')) upwards around the palatal cusps ((1a), (2a), (3a), (4a), and (5a)) on the maxillary posterior teeth such that the palatal cusps still remain within the centric stops of the mandibular posterior teeth selected from centric stops ((8a*), (8b*), (8c*), and (8d*)).

The artificial denture teeth of the invention present clearly defined upper palatal stamp cusps on one or more of the maxillary posterior teeth selected from palatal cusps ((1a), (2a), (3a), (4a), and (5a)) and centric stops on the occluding (biting) surfaces of one or more of the mandibular posterior teeth selected from centric stops ((8a*), (8b*), (8c*), and (8d*)). The design of the artificial denture teeth is particularly of merit for complete dentures. This design enables the denture teeth to be easily set up in a number of different occlusal schemes including lingualised, balanced, cross bite, and edge to edge occlusal schemes. However, the present invention specifically relates to sets of artificial teeth in which the teeth are set up in either balanced or lingualised occlusal schemes and can be readily switched between the two schemes.

The sets of artificial teeth according to the present invention may be set up in either balanced or lingualised occlusal schemes, and if one of these schemes is chosen and proves not to be acceptable in a particular clinical case, then the dental technician can readily change to the alternate occlusal scheme. This is achieved by softening the wax or resin under the maxillary posterior teeth and rotating the teeth as described to bring them into the alternate occlusal scheme. The tooth shape allows a simple rotation around one or more stamp cusps ((1a), (2a), (3a), (4a), and (5a)) of the maxillary posterior teeth which still remain within their occlusal stops in the opposing mandibular posterior teeth selected from centric stops ((8a*), (8b*), (8c*), and (8d*)), thereby maintaining the relative positions of the teeth concerned, and making changing the occlusal scheme easy to carry out.

Preferably, the change to the alternate occlusal scheme is achieved by softening the wax or resin under the maxillary posterior teeth and simply rotating the upper buccal cusps around the upper palatal stamp cusp or cusps ((1a), (2a), (3a), (4a), and (5a)). In the case of changing from a lingualised to a balanced occlusal scheme, the upper buccal cusps are rotated downwards. In the case of changing from a balanced to a lingualised scheme, the upper buccal cusps are rotated upwards. Although in the conventional approach, this is achieved by simply softening the wax or resin and rotating the teeth, in digitally constructed dentures this is achieved by making adjustments within the software.

DETAILED DESCRIPTION OF THE INVENTION

Figure 1:
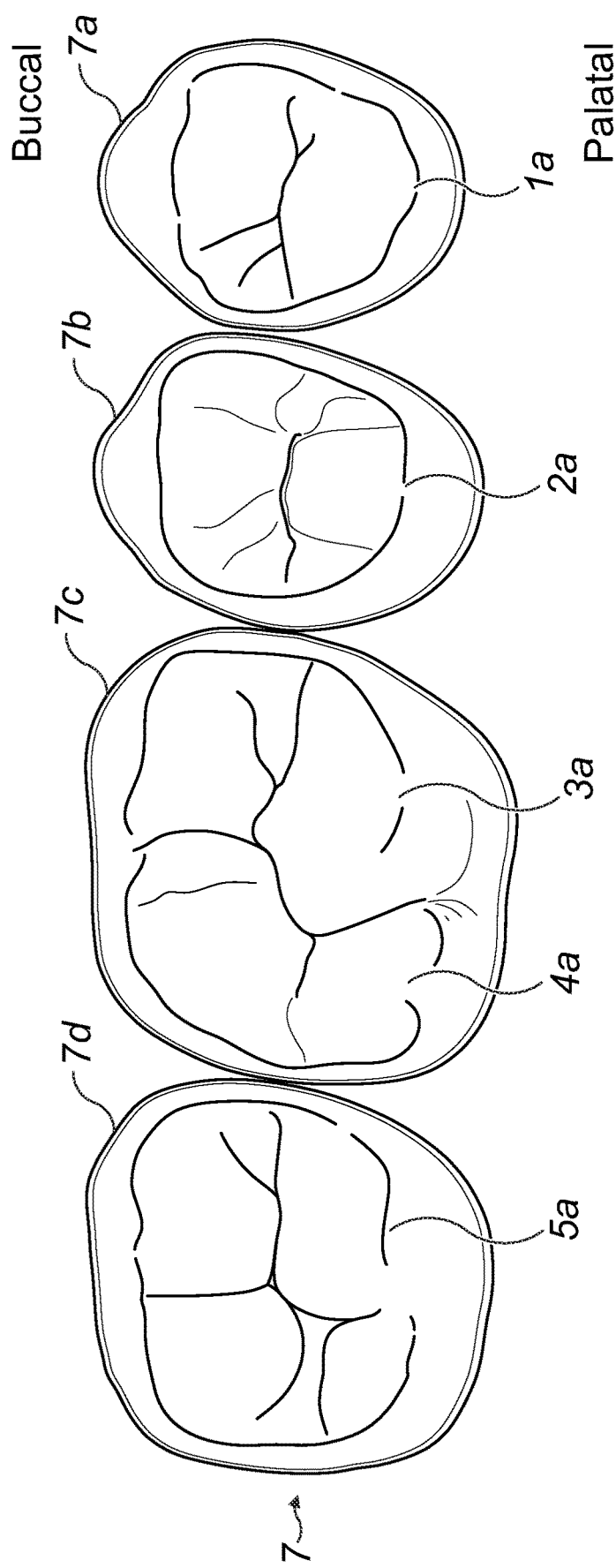
FIG. 1 shows the occlusal surface of maxillary posterior teeth embodying the invention.
Figure 2:
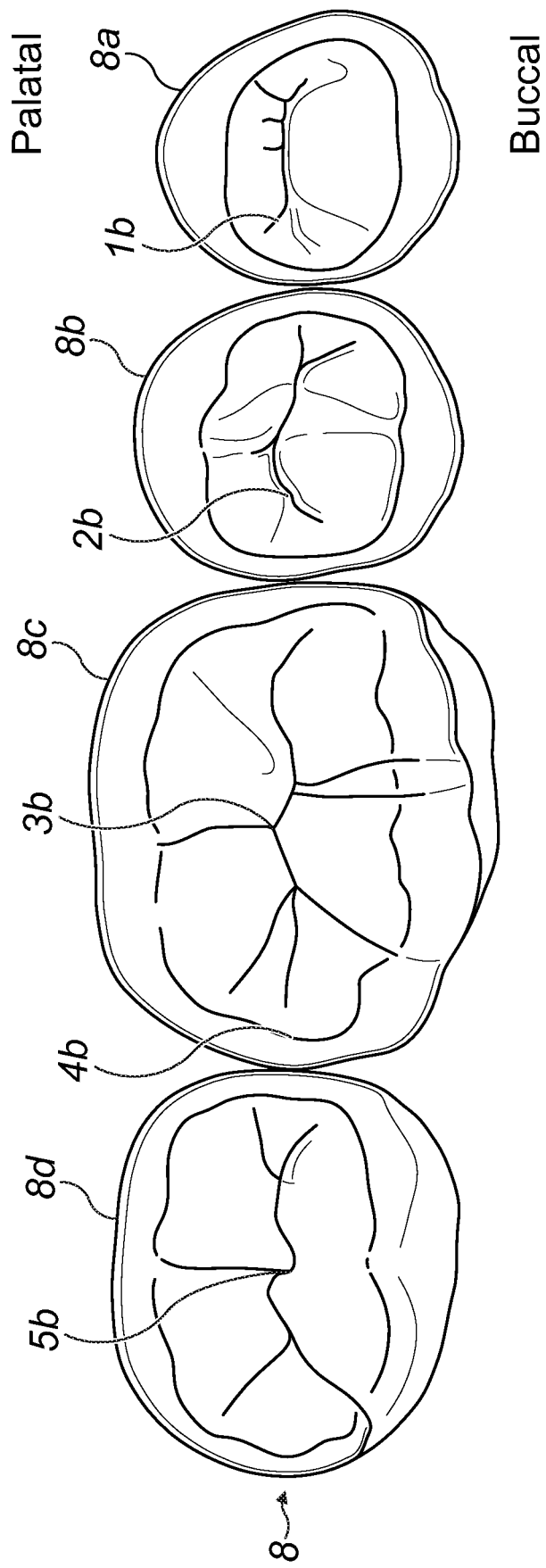
FIG. 2 shows the occlusal surface of mandibular posterior teeth embodying the invention.
Figure 3:
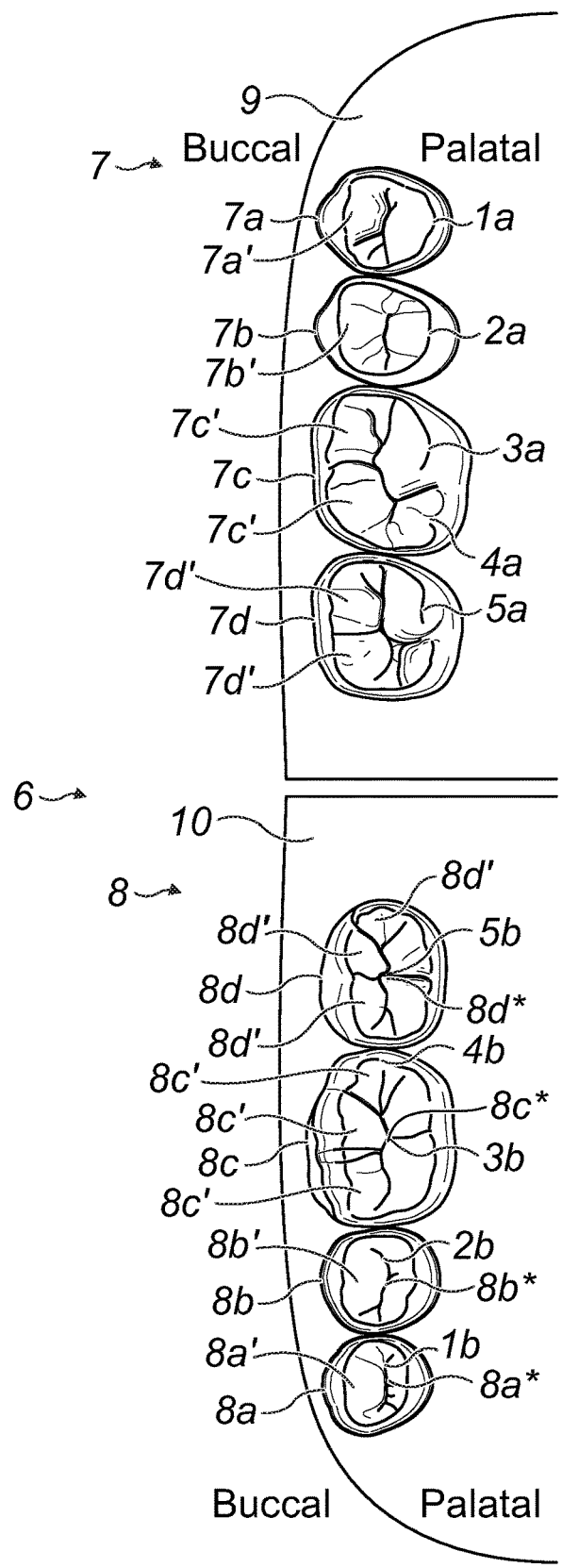
FIG. 3 shows a set of artificial teeth embodying the invention.
Figure 4:
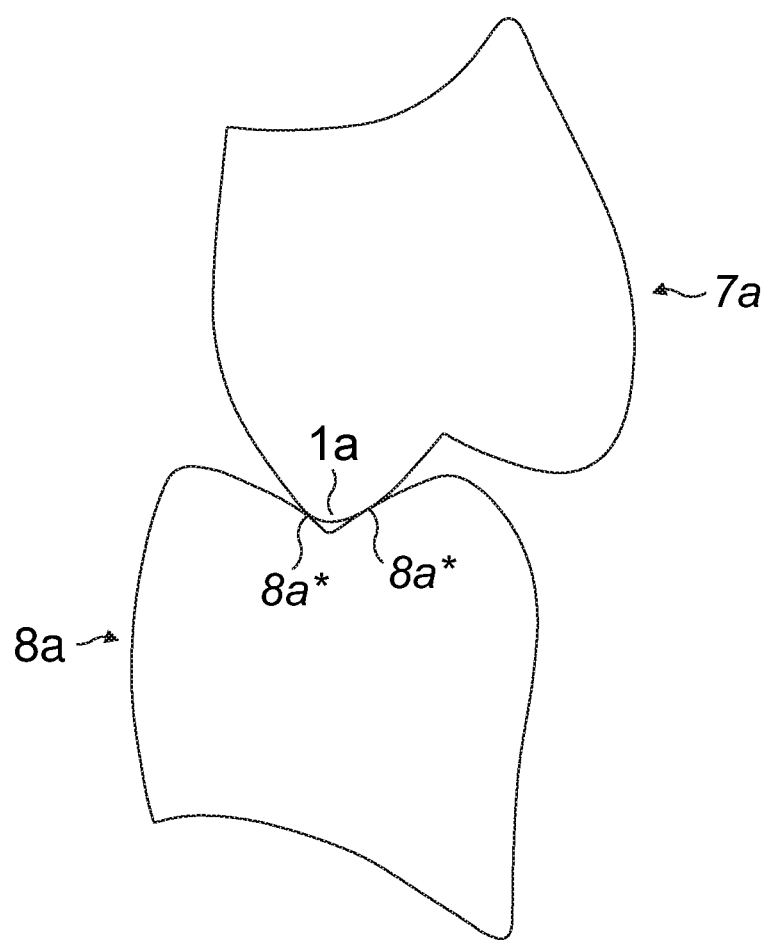
FIG. 4 shows a cross-sectional view of a single maxillary tooth and a single mandibular tooth when set up and engaged in lingualised occlusion.
Figure 5:
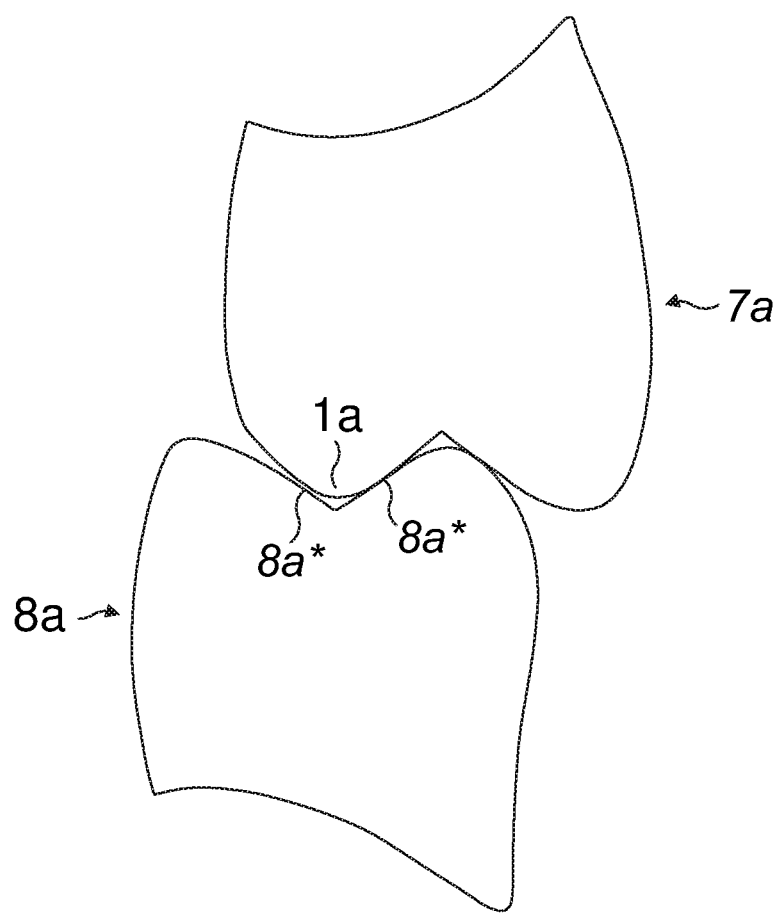
FIG. 5 shows a cross-sectional view of a single maxillary tooth and a single mandibular tooth when set up and engaged in balanced occlusion.

The present invention provides a set of artificial teeth comprising a maxillary unit (7) and a mandibular unit (8) in which, when set up in lingualised occlusion, at least one of following occurs: the palatal cusp (1a) of the maxillary posterior tooth (7a) fits into the distal fossa (1b) of the mandibular posterior tooth (8a), the palatal cusp (2a) of the maxillary posterior tooth (7b) fits into the distal fossa (2b) of the mandibular posterior tooth (8b), the mesial palatal cusp (3a) of the maxillary posterior tooth (7c) fits into the central fossa (3b) of the mandibular posterior tooth (8c), the distal palatal cusp (4a) of the maxillary posterior tooth (7c) fits onto the marginal ridge (4b) of the mandibular posterior tooth (8c) and the mesial palatal cusp (5a) of the maxillary posterior tooth (7d) fits into the central fossa (5b) of the mandibular posterior tooth (8d), and wherein the buccal cusps of the mandibular posterior teeth selected from buccal cusps ((8a'), (8b'), (8c'), and (8d')) are out of contact with the maxillary posterior teeth ((7a), (7b), (7c), and (7d)), such that the cusp/fossa dimensions and relationships of the teeth concerned enable the occlusal scheme for the teeth to be changed from lingualised to balanced occlusion simply by softening the wax or resin under the mandibular posterior teeth and rotating the upper buccal cusps selected from buccal cusps ((7a'), (7b'), (7c'), and (7d')) downwards around the palatal cusps ((1a), (2a), (3a), (4a), and (5a)) on the maxillary posterior teeth such that the palatal cusps still remain within the centric stops of the mandibular posterior teeth selected from centric stops ((8a*), (8b*), (8c*), and (8d*)).

The present invention also provides a set of artificial teeth comprising a maxillary unit (7) and a mandibular unit (8) in which, when set up in balanced occlusion, at least one of following occurs: the palatal cusp (1a) of the maxillary posterior tooth (7a) fits into the distal fossa (1b) of the mandibular posterior tooth (8a), the palatal cusp (2a) of the maxillary posterior tooth (7b) fits into the distal fossa (2b) of the mandibular posterior tooth (8b), the mesial palatal cusp (3a) of the maxillary posterior tooth (7c) fits into the central fossa (3b) of the mandibular posterior tooth (8c), the distal palatal cusp (4a) of the maxillary posterior tooth (7c) fits onto the marginal ridge (4b) of the mandibular posterior tooth (8c) and the mesial palatal cusp (5a) of the maxillary posterior tooth (7d) fits into the central fossa (5b) of the mandibular posterior tooth (8d), and wherein at least one of the buccal cusps of the maxillary posterior teeth selected from buccal cusps ((8a'), (8b'), (8c'), and (8d')) are in contact with the maxillary posterior teeth selected from the maxillary posterior teeth ((7a), (7b), (7c), and (7d), such that the cusp/fossa dimensions and relationships of the teeth concerned enable the occlusal scheme for the teeth to be changed from balanced to lingualised occlusion simply by softening the wax or resin under the maxillary posterior teeth and rotating the upper buccal cusps selected from buccal cusps ((7a'), (7b'), (7c'), and (7d')) upwards around the palatal cusps ((1a), (2a), (3a), (4a), and (5a)) on the maxillary posterior teeth such that the palatal cusps still remain within the centric stops of the mandibular posterior teeth selected from centric stops ((8a*), (8b*), (8c*), and (8d*)).

The following definitions shall apply throughout the specification and the appended claims.

Within the context of the present specification, the term "comprises" is taken to mean "includes" or "contains", i.e. other integers or features may be present, whereas the term "consists of" is taken to mean "consists exclusively of".

Within the present specification, the term "about" means plus or minus 20%; more preferably plus or minus 10%; even more preferably plus or minus 5%; most preferably plus or minus 2%.

Within the present specification, the term "denture" means a prosthetic device constructed to replace missing teeth; a denture consists of a denture base that is supported by the soft and hard tissues of the oral cavity, and artificial denture teeth that restore aesthetics and function for a patient.

Within the present specification, the term "stamp cusp" means a tooth cusp that, when the tooth is in occlusion, fits in the fossa of the antagonist tooth in a mortar-and-pestle fashion.

Within the present specification, the term "centric stop" means a stable point of contact between occluded maxillary and mandibular teeth. Centric stops are located in the central fossa, marginal ridges and buccal and lingual cusps of posterior teeth.

As described above, in the set of artificial teeth set up in lingualised occlusion according to the present invention, at least one of the following occurs: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

Preferably, in the set of artificial teeth set up in lingualised occlusion according to the present invention, at least two of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

More preferably, in the set of artificial teeth set up in lingualised occlusion according to the present invention, at least three of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

More particularly preferably, in the set of artificial teeth set up in lingualised occlusion according to the present invention, at least four of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

Most preferably, in the set of artificial teeth set up in lingualised occlusion according to the present invention, all of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

In a preferred embodiment, the present invention provides a set of artificial teeth set up in lingualised occlusion as described above, wherein the cusp/fossa dimensions and relationships of the teeth concerned enable the occlusal scheme for the teeth to be changed from lingualised to balanced occlusion. The change from lingualised to balanced occlusion is preferably achieved simply by softening the wax or resin under the maxillary posterior teeth and rotating the upper buccal cusps selected from buccal cusps ((7a'), (7b'), (7c'), and (7d')) downwards around the palatal stamp cusps ((1a), (2a), (3a), (4a), and (5a)) on the maxillary posterior teeth such that the palatal cusps still remain within the centric stops of the mandibular posterior teeth selected from centric stops ((8a*), (8b*), (8c*), and (8d*)).

As described above, in the set of artificial teeth set up in balanced occlusion according to the present invention, at least one of the following occurs: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

Preferably, in the set of artificial teeth set up in balanced occlusion according to the present invention, at least two of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

More preferably, in the set of artificial teeth set up in balanced occlusion according to the present invention, at least three of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

More particularly preferably, in the set of artificial teeth set up in balanced occlusion according to the present invention, at least four of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

Most preferably, in the set of artificial teeth set up in balanced occlusion according to the present invention, all of the following occur: the palatal cusp (1a) of the maxillary posterior tooth (7a) fits into the distal fossa (1b) of the mandibular posterior tooth (8a); the palatal cusp (2a) of the maxillary posterior tooth (7b) fits into the distal fossa (2b) of the mandibular posterior tooth (8b); the mesial palatal cusp (3a) of the maxillary posterior tooth (7c) fits into the central fossa (3b) of the mandibular posterior tooth (8c); the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

As described above, in the set of artificial teeth set up in balanced occlusion according to the present invention, at least some of the buccal cusps of the mandibular posterior teeth selected from buccal cusps ((8a'), (8b'), (8c'), and (8d')) are in contact with the maxillary posterior teeth selected from maxillary posterior teeth ((7a), (7b), (7c), and (7d)). Preferably, in the set of artificial teeth set up in balanced occlusion according to the present invention, at least one buccal cusp of the mandibular posterior teeth is in contact selected from buccal cusps ((8a'), (8b'), (8c'), and (8d')) with the maxillary posterior teeth selected from maxillary posterior teeth ((7a), (7b), (7c), and (7d)). More preferably, at least two, at least three, or at least four buccal cusps of the mandibular posterior teeth selected from buccal cusps ((8a'), (8b'), (8c'), and (8d')) are in contact with the maxillary posterior teeth selected from maxillary posterior teeth ((7a), (7b), (7c), and (7d)). Most preferably, all of the buccal cusps of the mandibular posterior teeth selected from buccal cusps ((8a'), (8b'), (8c'), and (8d')) of the set of artificial teeth are in contact with the maxillary posterior teeth selected from maxillary posterior teeth ((7a), (7b), (7c), and (7d)). In centric occlusion, the buccal cusps of the mandibular posterior teeth are in contact with the central fossae of the maxillary posterior teeth. In excursive movements the buccal cusps of the mandibular posterior teeth remain substantially in contact with the maxillary teeth, smoothly moving to contact with the buccal cusps of the maxillary teeth on the working side. Conversely the buccal cusps remain substantially in contact with the maxillary teeth, smoothly moving to contact with the buccal cusps of the maxillary teeth on the balancing side.

In a preferred embodiment, the present invention provides a set of artificial teeth set up in balanced occlusion as described above, wherein the cusp/fossa dimensions and relationships of the teeth concerned enable the occlusal scheme for the teeth to be changed from balanced to lingualised occlusion. The change from balanced to lingualised occlusion is preferably achieved simply by softening the wax or resin under the maxillary posterior teeth and rotating the upper buccal cusps upwards around the palatal stamp cusps ((1a), (2a), (3a), (4a), and (5a)) on the maxillary teeth such that stamp cusps still remain within the centric stops of the mandibular posterior teeth selected from centric stops ((8a*), (8b*), (8c*), and (8d*)).

As described above, the set of artificial teeth according to the invention comprises a maxillary unit (7) and a mandibular unit (8). Typically, the maxillary unit and the mandibular unit of the set of artificial teeth may be regarded as a maxillary unit and mandibular unit pair. In a preferred embodiment, the set of artificial teeth comprises two maxillary unit and mandibular unit pairs, each unit designed for arrangement in a respective quadrant of the patient's mouth.

The maxillary unit (7) typically comprises a wax or resin base (9) supporting at least three, or at least four maxillary posterior teeth selected from maxillary posterior teeth ((7a), (7b), (7c), and (7d)). In one preferred embodiment, the maxillary unit comprises a wax or resin base (9) supporting three maxillary posterior teeth selected from maxillary posterior teeth ((7a), (7b), (7c), and (7d)). In this embodiment, the maxillary unit preferably comprises a wax or resin base (9) supporting first and second maxillary pre-molar teeth ((7a) and (7b)) and a single maxillary molar tooth selected from maxillary posterior teeth ((7c) and (7d)). More preferably, the maxillary unit comprises a wax or resin base (9) supporting four maxillary posterior teeth selected from maxillary posterior teeth ((7a), (7b), (7c), and (7d)). In a particularly preferred embodiment, the maxillary unit comprises a wax or resin base (9) supporting first and second maxillary pre-molar teeth (7a) and (7b) and first and second maxillary molar teeth (7c) and (7d). Accordingly, the maxillary unit preferably comprises a wax or resin base and at least three of the maxillary posterior teeth ((7a), (7b), (7c), and (7d)). Preferably, the maxillary unit comprises a wax or resin base and at least the maxillary posterior teeth ((7a), (7b), and (7c)). More preferably, the maxillary unit comprises a wax or resin base and all four of the maxillary posterior teeth ((7a), (7b), (7c), and (7d)).

The mandibular unit (8) typically comprises a wax base supporting at least three, or at least four mandibular posterior teeth selected from mandibular posterior teeth ((8a), (8b), (8c), and (8d)). In one preferred embodiment, the mandibular unit comprises a wax or resin base (10) supporting three mandibular posterior teeth selected from mandibular posterior teeth ((8a), (8b), (8c), and (8d)). In this embodiment, the mandibular unit preferably comprises a wax or resin base (10) supporting first and second mandibular pre-molar teeth ((8a) and (8b)) and a single mandibular molar tooth selected from mandibular posterior teeth ((8c) and (8d)). More preferably, the mandibular unit comprises a wax or resin base (10) supporting four mandibular posterior teeth selected from mandibular posterior teeth ((8a), (8b), (8c), and (8d)). In a particularly preferred embodiment, the mandibular unit comprises a wax or resin base supporting first and second mandibular pre-molar teeth (8a) and (8b) and first and second mandibular molar teeth (8c) and (8d). Accordingly, the mandibular unit preferably comprises a wax or resin base (10) and at least three of the mandibular posterior teeth ((8a), (8b), (8c), and (8d)). Preferably, the maxillary unit comprises a wax or resin base and at least the mandibular posterior teeth ((8a), (8b), and (8c)). More preferably, the mandibular unit comprises a wax or resin base and all four of the mandibular posterior teeth ((8a), (8b), (8c), and (8d)).

In a preferred embodiment in which the maxillary unit (7) comprises a wax or resin base (9) supporting four maxillary posterior teeth selected from maxillary posterior teeth ((7a), (7b), (7c), and (7d)), the width of the set of four upper or maxillary posterior teeth selected from maxillary posterior teeth ((7a), (7b), (7c), and (7d)) is from about 20 mm to about 60 mm. More preferably, the width of the set of four maxillary posterior teeth selected from maxillary posterior teeth ((7a), (7b), (7c), and (7d)) is between about 25 mm and about 40 mm. In a preferred embodiment in which the mandibular unit (8) comprises a wax or resin base (10) supporting four mandibular posterior teeth selected from mandibular posterior teeth ((8a), (8b), (8c), and (8d)), the width of the set of four mandibular posterior teeth selected from mandibular posterior teeth ((8a), (8b), (8c), and (8d)) is from about 20 mm to about 65 mm. More preferably, the width of the set of four mandibular posterior teeth selected from mandibular posterior teeth ((8a), (8b), (8c), and (8d)) is between about 26 mm and about 44 mm.

In a preferred embodiment, the buccal cusp angles of the set of artificial teeth are typically in the range of between about 10° and about 40°. In another preferred embodiment, the height of the palatal cusps and/or buccal cusps is typically between about 1 mm and about 5 mm.

The sets of artificial teeth of the present invention may be produced by any suitable method known to the skilled person such as compression moulding, injection moulding, transfer moulding, milling or 3D printing.

Individual teeth for use in the sets of artificial teeth of the present invention may be formed from any suitable material known to the skilled person. Preferably, the individual teeth are formed from one or more synthetic resins, such as acrylates, which may when so required be filled with organic or inorganic fillers in order to improve their properties, or from porcelain or other inorganic material.

The present invention also provides a method for the production of a denture comprising: (i) providing a set of artificial teeth set up in lingualised occlusion according to the present invention, (ii) checking for acceptability of the chosen occlusal scheme, (iii) if necessary, changing to the alternate balanced occlusal scheme for the teeth by softening the wax or resin under the maxillary posterior teeth and rotating the upper buccal cusps selected from buccal cusps ((7a'), (7b'), (7c'), and (7d')) downwards around the said palatal cusps ((1a), (2a), (3a), (4a), and (5a)) on the maxillary teeth such that the palatal cusps still remain substantially within the centric stops of the mandibular posterior teeth selected from centric stops ((8a*), (8b*), (8c*), and (8d*)), and (iv) processing and finishing to produce the denture.

Similarly, the present invention also provides a method for the production of a denture comprising: (i) providing a set of artificial teeth set up in balanced occlusion according to the present invention, (ii) checking for acceptability of the chosen occlusal scheme, (iii) if necessary, changing to the alternate lingualised occlusal scheme for the teeth by softening the wax or resin under the maxillary posterior teeth and rotating the upper buccal cusps selected from buccal cusps ((7a'), (7b'), (7c'), and (7d')) upwards around the said palatal cusps ((1a), (2a), (3a), (4a), and (5a)) on the maxillary teeth such that the palatal cusps still remain substantially within the centric stops of the mandibular posterior teeth selected from centric stops ((8a*), (8b*), (8c*), and (8d*)), and (iv) processing and finishing to produce the denture.

Embodiments have been described herein in a concise way. It should be appreciated that features of these embodiments may be variously separated or combined within the invention.

The invention claimed is:

1. A set of artificial teeth (6), comprising:
 a maxillary unit (7) and a mandibular unit (8);
 wherein the maxillary unit (7) comprises a wax or resin base (9) supporting maxillary posterior teeth ((7a), (7b), (7c), and (7d)), wherein the wax or resin base (9) can be softened by heat;
 wherein the mandibular unit (8) comprises a wax or resin base (10) supporting mandibular posterior teeth ((8a), (8b), (8c), and (8d));
 wherein the maxillary posterior teeth each comprise a buccal cusp selected from buccal cusps ((7a'), (7b'), (7c'), and (7d'));
 wherein the mandibular posterior teeth each comprise a buccal cusp selected from buccal cusps ((8a'), (8b'), (8c'), and (8d'));
 wherein the maxillary posterior teeth and the mandibular posterior teeth are in a lingualised occlusion;
 wherein at least one of following occurs, when the maxillary posterior teeth and the mandibular posterior teeth are in a lingualised occlusion:
  palatal cusp (1a) of the maxillary posterior tooth (7a) fits into distal fossa (1b) of the mandibular posterior tooth (8a);
  palatal cusp (2a) of the maxillary posterior tooth (7b) fits into distal fossa (2b) of the mandibular posterior tooth (8b);
  mesial palatal cusp (3a) of the maxillary posterior tooth (7c) fits into central fossa (3b) of the mandibular posterior tooth (8c);

distal palatal cusp (4a) of the maxillary posterior tooth (7c) fits onto marginal ridge (4b) of the mandibular posterior tooth (8c); and mesial palatal cusp (5a) of the maxillary posterior tooth (7d) fits into central fossa (5b) of the mandibular posterior tooth (8d); and wherein buccal cusps ((8a'), (8b'), (8c'), and (8d')) are out of contact with maxillary posterior teeth ((7a), (7b), (7c), and (7d)), such that the cusp/fossa dimensions and relationships of the teeth concerned enable a lingualised occlusion for the teeth to be changed from the lingualised to a balanced occlusion by softening wax or resin under the maxillary posterior teeth and rotating buccal cusps ((7a'), (7b'), (7c'), and (7d')) downwards around the palatal cusps ((1a), (2a), (3a), (4a), and (5a)) on the maxillary posterior teeth such that the palatal cusps remain within centric stops ((8a*), (8b*), (8c*), and (8d*)) of the mandibular posterior teeth.

2. A set of artificial teeth according to claim 1, wherein at least two of the following occur:
the palatal cusp (1a) of the maxillary posterior tooth (7a) fits into the distal fossa (1b) of the mandibular posterior tooth (8a);
the palatal cusp (2a) of the maxillary posterior tooth (7b) fits into the distal fossa (2b) of the mandibular posterior tooth (8b);
the mesial palatal cusp (3a) of the maxillary posterior tooth (7c) fits into the central fossa (3b) of the mandibular posterior tooth (8c);
the distal palatal cusp (4a) of the maxillary posterior tooth (7c) fits onto the marginal ridge (4b) of the mandibular posterior tooth (8c); and
the mesial palatal cusp (5a) of the maxillary posterior tooth (7d) fits into the central fossa (5b) of the mandibular posterior tooth (8d).

3. A set of artificial teeth according to claim 1, wherein at least three of the following occur:
the palatal cusp (1a) of the maxillary posterior tooth (7a) fits into the distal fossa (1b) of the mandibular posterior tooth (8a);
the palatal cusp (2a) of the maxillary posterior tooth (7b) fits into the distal fossa (2b) of the mandibular posterior tooth (8b);
the mesial palatal cusp (3a) of the maxillary posterior tooth (7c) fits into the central fossa (3b) of the mandibular posterior tooth (8c);
the distal palatal cusp (4a) of the maxillary posterior tooth (7c) fits onto the marginal ridge (4b) of the mandibular posterior tooth (8c); and
the mesial palatal cusp (5a) of the maxillary posterior tooth (7d) fits into the central fossa (5b) of the mandibular posterior tooth (8d).

4. A set of artificial teeth according to claim 1, wherein at least four of the following occur:
the palatal cusp (1a) of the maxillary posterior tooth (7a) fits into the distal fossa (1b) of the mandibular posterior tooth (8a);
the palatal cusp (2a) of the maxillary posterior tooth (7b) fits into the distal fossa (2b) of the mandibular posterior tooth (8b);
the mesial palatal cusp (3a) of the maxillary posterior tooth (7c) fits into the central fossa (3b) of the mandibular posterior tooth (8c);
the distal palatal cusp (4a) of the maxillary posterior tooth (7c) fits onto the marginal ridge (4b) of the mandibular posterior tooth (8c); and
the mesial palatal cusp (5a) of the maxillary posterior tooth (7d) fits into the central fossa (5b) of the mandibular posterior tooth (8d).

5. A set of artificial teeth according to claim 1, wherein all of the following occur:
the palatal cusp (1a) of the maxillary posterior tooth (7a) fits into the distal fossa (1b) of the mandibular posterior tooth (8a);
the palatal cusp (2a) of the maxillary posterior tooth (7b) fits into the distal fossa (2b) of the mandibular posterior tooth (8b);
the mesial palatal cusp (3a) of the maxillary posterior tooth (7c) fits into the central fossa (3b) of the mandibular posterior tooth (8c);
the distal palatal cusp (4a) of the maxillary posterior tooth (7c) fits onto the marginal ridge (4b) of the mandibular posterior tooth (8c); and
the mesial palatal cusp (5a) of the maxillary posterior tooth (7d) fits into the central fossa (5b) of the mandibular posterior tooth (8d).

6. A set of artificial teeth according to claim 1, wherein one or more of the maxillary posterior teeth each have a palatal stamp cusp; wherein one or more of the mandibular posterior teeth each have a centric stop selected from centric stops ((8a*), (8b*), (8c*), and (8d*)) on their occluding surfaces.

7. A set of artificial teeth according to claim 1, wherein the set of artificial teeth comprises two maxillary unit (7) and mandibular unit (8) pairs, the units each designed for arrangement in a respective quadrant of the patient's mouth.

8. A method for the production of a denture comprising: (i) providing a set of artificial teeth set up in lingualised occlusion according to claim 1, (ii) checking for the chosen occlusal scheme, (iii) changing to the alternate balanced occlusal scheme for the teeth by softening the wax or resin under the maxillary posterior teeth and rotating maxillary buccal cusps ((7a'), (7b'), (7c'), and (7d')) downwards around the palatal cusps ((1a), (2a), (3a), (4a), and (5a)) on the maxillary posterior teeth such that the palatal cusps remain within centric stops ((8a*), (8b*), (8c*), and (8d*)) of the mandibular posterior teeth.

9. A set of artificial teeth (6), comprising:
a maxillary unit (7) and a mandibular unit (8);
wherein the maxillary unit (7) comprises a wax or resin base (9) supporting maxillary posterior teeth ((7a), (7b), (7c), and (7d)), wherein the wax or resin base (9) can be softened by heat;
wherein the mandibular unit (8) comprises a wax or resin base (10) supporting mandibular posterior teeth ((8a), (8b), (8c), and (8d));
wherein the maxillary posterior teeth each comprise a buccal cusp selected from buccal cusps ((7a'), (7b'), (7c'), and (7d'));
wherein the mandibular posterior teeth each comprise a buccal cusp selected from buccal cusps ((8a'), (8b'), (8c'), and (8d');
wherein the maxillary posterior teeth and the mandibular posterior teeth are in a balanced occlusion;
wherein at least one of following occurs, when the maxillary posterior teeth and the mandibular posterior teeth are in a balanced occlusion:
palatal cusp (1a) of the maxillary posterior tooth (7a) fits into distal fossa (1b) of the mandibular posterior tooth (8a);
palatal cusp (2a) of the maxillary posterior tooth (7b) fits into distal fossa (2b) of the mandibular posterior tooth (8b);

mesial palatal cusp (3a) of the maxillary posterior tooth (7c) fits into central fossa (3b) of the mandibular posterior tooth (8c);

distal palatal cusp (4a) of the maxillary posterior tooth (7c) fits onto marginal ridge (4b) of the mandibular posterior tooth (8c); and mesial palatal cusp (5a) of the maxillary posterior tooth (7d) fits into central fossa (5b) of the mandibular posterior tooth (8d); and wherein buccal cusps ((8a'), (8b'), (8c'), and (8d')) are in contact with the maxillary posterior teeth ((7a), (7b), (7c), and (7d)), such that the cusp/fossa dimensions and relationships of the teeth concerned enable a balanced occlusion for the teeth to be changed from the balanced to a lingualised occlusion by softening wax or resin under the maxillary posterior teeth and rotating buccal cusps ((7a'), (7b'), (7c'), and (7d')) upwards around the palatal cusps ((1a), (2a), (3a), (4a), and (5a)) on the maxillary posterior teeth such that the palatal cusps remain within centric stops ((8a*), (8b*), (8c*), and (8d*)) of mandibular posterior teeth.

10. A set of artificial teeth according to claim 9, wherein at least two of the following occur:

the palatal cusp (1a) of the maxillary posterior tooth (7a) fits into the distal fossa (1b) of the mandibular posterior tooth (8a);

the palatal cusp (2a) of the maxillary posterior tooth (7b) fits into the distal fossa (2b) of the mandibular posterior tooth (8b);

the mesial palatal cusp (3a) of the maxillary posterior tooth (7c) fits into the central fossa (3b) of the mandibular posterior tooth (8c);

the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

11. A set of artificial teeth according to claim 9, wherein at least three of the following occur:

the palatal cusp (1a) of the maxillary posterior tooth (7a) fits into the distal fossa (1b) of the mandibular posterior tooth (8a);

the palatal cusp (2a) of the maxillary posterior tooth (7b) fits into the distal fossa (2b) of the mandibular posterior tooth (8b);

the mesial palatal cusp (3a) of the maxillary posterior tooth (7c) fits into the central fossa (3b) of the mandibular posterior tooth (8c);

the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

12. A set of artificial teeth according to claim 9, wherein at least four of the following occur:

the palatal cusp (1a) of the maxillary posterior tooth (7a) fits into the distal fossa (1b) of the mandibular posterior tooth (8a);

the palatal cusp (2a) of the maxillary posterior tooth (7b) fits into the distal fossa (2b) of the mandibular posterior tooth (8b);

the mesial palatal cusp (3a) of the maxillary posterior tooth (7c) fits into the central fossa (3b) of the mandibular posterior tooth (8c);

the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

13. A set of artificial teeth according to claim 9, wherein all of the following occur:

the palatal cusp (1a) of the maxillary posterior tooth (7a) fits into the distal fossa (1b) of the mandibular posterior tooth (8a);

the palatal cusp (2a) of the maxillary posterior tooth (7b) fits into the distal fossa (2b) of the mandibular posterior tooth (8b);

the mesial palatal cusp (3a) of the maxillary posterior tooth (7c) fits into the central fossa (3b) of the mandibular posterior tooth (8c);

the distal palatal cusp (4a) of the maxillary posterior tooth (7c) fits onto the marginal ridge (4b) of the mandibular posterior tooth (8c); and the mesial palatal cusp (5a) of the maxillary posterior tooth (7d) fits into the central fossa (5b) of the mandibular posterior tooth (8d).

14. A set of artificial teeth according to claim 9, wherein at least two buccal cusps of the mandibular posterior teeth are in contact with the maxillary posterior teeth.

15. A set of artificial teeth according to claim 14, wherein all of the buccal cusps of the mandibular posterior teeth of the set of artificial teeth are in contact with the maxillary posterior teeth.

16. A method for the production of a denture comprising: (i) providing a set of artificial teeth set up in balanced occlusion according to claim 9, (ii) checking for the chosen occlusal scheme, (iii) changing to the alternate lingualised occlusal scheme for the teeth by softening the wax or resin under the maxillary posterior teeth and rotating maxillary buccal cusps ((7a'), (7b'), (7c'), and (7d')) upwards around the palatal cusps ((1a), (2a), (3a), (4a), and (5a)) on the maxillary posterior teeth such that the palatal cusps remain within centric stops ((8a*), (8b*), (8c*), and (8d*)) of the mandibular posterior teeth.

* * * * *